United States Patent [19]

Bengtsson

[11] 4,419,039
[45] Dec. 6, 1983

[54] APPARATUS FOR LOADING OBJECTS

[76] Inventor: Bengt A. Bengtsson, 2 Silurvagen, 595 00 Mjolby, Sweden

[21] Appl. No.: 240,296

[22] Filed: Mar. 4, 1981

[51] Int. Cl.³ .............................................. B66F 9/00
[52] U.S. Cl. .................................. 414/590; 414/222; 414/417; 414/752
[58] Field of Search ............... 414/589, 590, 752, 222, 414/225, 744 B, 737, 626, 273, 749, 417, 337; 209/592–595, 643; 114/72, 259, 260; 198/635, 637, 599

[56] References Cited

U.S. PATENT DOCUMENTS

| 2,266,807 | 12/1941 | Rooney | 209/592 |
|---|---|---|---|
| 3,142,398 | 7/1964 | Roth | 414/417 |
| 3,490,622 | 1/1970 | Brackin | 414/626 X |
| 3,670,869 | 6/1972 | Dimmock | 198/637 X |
| 3,807,553 | 4/1974 | Billett et al. | 271/190 X |

FOREIGN PATENT DOCUMENTS

| 2439032 | 2/1976 | Fed. Rep. of Germany | 414/752 |
|---|---|---|---|
| 2600957 | 7/1976 | Fed. Rep. of Germany | 414/752 |
| 53-36869 | 4/1978 | Japan | 414/590 |
| 1052051 | 12/1966 | United Kingdom | |

Primary Examiner—Leslie J. Paperner
Assistant Examiner—Donald W. Underwood
Attorney, Agent, or Firm—Finnegan, Henderson, Farabow, Garrett & Dunner

[57] ABSTRACT

An apparatus for loading objects on a pallet has a first horizontal frame structure movable vertically relative to an upright support. The first frame structure supports a second horizontal frame which is movable horizontally in respect to the first frame structure. The second frame supports a carriage which is horizontally movable relative to said second frame in a direction perpendicular to the horizontal movement of the second frame and is provided with an angularly movable catching element such that said catching element by the displacement of the second frame in one horizontal direction and the displacement of the carriage in a horizontal direction perpendicular thereto may be located over an object located at a loading area within the area of said first frame structure, then lowering said first frame structure and activating the catching element, elevating said first frame structure and displacing the second frame and the carriage to the desired unloading position. If necessary the catching element is the angularly shifted and finally the first frame is lowered and the catching element de-activated.

The first frame is rectangular and is open at one end thereof and may have the second frame and the carriage thereof substituted by a shuttle table and may be provided with means to detachably receive a cross bar assembly to adapt the apparatus for transferring several objects loaded upon said shuttle table to a position above the unloading area and by means of said cross bar forcing them off the table in such position.

5 Claims, 6 Drawing Figures

APPARATUS FOR LOADING OBJECTS

BACKGROUND OF THE INVENTION

1. Field of the Invention

The present invention relates to an apparatus for loading and stacking objects on a pallet or the like and comprises an upright support for a mechanism provided to transfer an object such as a package from a first area, for instance a platform or a floor, to a second area, for instance a pallet.

2. Description of the Prior Art

Known in the art is an apparatus with an arm which is pivotally mounted about a vertical axis and connected to a second arm which is pivotally mounted about a horizontal axis and provided with a catching mechanism. Such an apparatus is disadvantageous in that it is difficult to move the arms to the correct positions and in that the load which may be carried by such an arm assembly is very restricted owing to the resulting strains. There is also a pronounced risk for swinging or oscillating movements of the objects during the transfer.

It is also known to arrange an upper fixed frame serving as a support for a second frame being provided to be longitudinally displaced relative to said upper frame and serving in turn to support a carriage provided to be moved transversally in respect of said fixed frame and carrying a catching mechanism which is vertically movable to enable it to be lowered into engagement with the object to be transferred and to be raised to and above the level occupied by the uppermost layer of a pile of objects stacked upon a pallet or the like. Such an apparatus is more easy to operate in an accurate manner than the first one in that the movements follow coordinates but also in this case the load which may be carried by such catching mechanism is restricted owing to the length of the catching mechanism and also in this case the objects tend to come into swinging or oscillating movements which makes it impossible to operate with high speeds.

SUMMARY OF THE INVENTION

With these and other drawbacks of the known devices in mind one object of the invention is to provide an apparatus for loading objects which is of a simple and reliable construction in that it only involves movements according to coordinates, which is sturdy such that the objects may be caught and transferred without being brought into oscillations or swinging movements and such that also heavy objects may be rapidly transferred. Another object of the invention is to provide an apparatus which in an easy manner can be changed from a loading scheme comprising automatic picking up preferably but one object at a time, orientating such object according to a stacking pattern and putting it down according to said pattern, to a scheme according to which a plurality of objects are first manually placed upon a shuttle table said table being then raised and displaced to a position over the pallet and lowered whereupon the objects are pushed off said shuttle table.

The foregoing and further objects of the invention have been attained by arranging a first horizontal frame structure which is movable vertically relative to an upright support structure. This frame structure supports a second horizontal frame which is movable horizontally relative to the first frame structure in one direction. The second frame supports a carriage which is movable in a direction perpendicular to the movement direction of said second frame and is provided with a catching mechanism such that said catching mechanism by the displacement of the second frame in one horizontal direction and the displacement of the carriage in a horizontal direction perpendicular thereto may be located over an object to be transferred at a loading area. By then lowering the first frame structure and activating the catching mechanism the object is caught and by elevating the first frame structure and displacing the second frame and the carriage to the desired unloading position and if necessary turning the catching mechanism and finally lowering the first frame and deactivating the catching mechanism the object is deposited upon the pallet in the desired position. By providing the second frame with a detachable cross bar structure and substituting a shuttle table for the carriage a manual stacking operation is possible.

BRIEF DESCRIPTION OF THE DRAWINGS

The drawings illustrate an examplifying embodiment of the invention and in the drawings.

DETAILED DESCRIPTION OF THE PREFERRED EMBODIMENT

Figure 1:
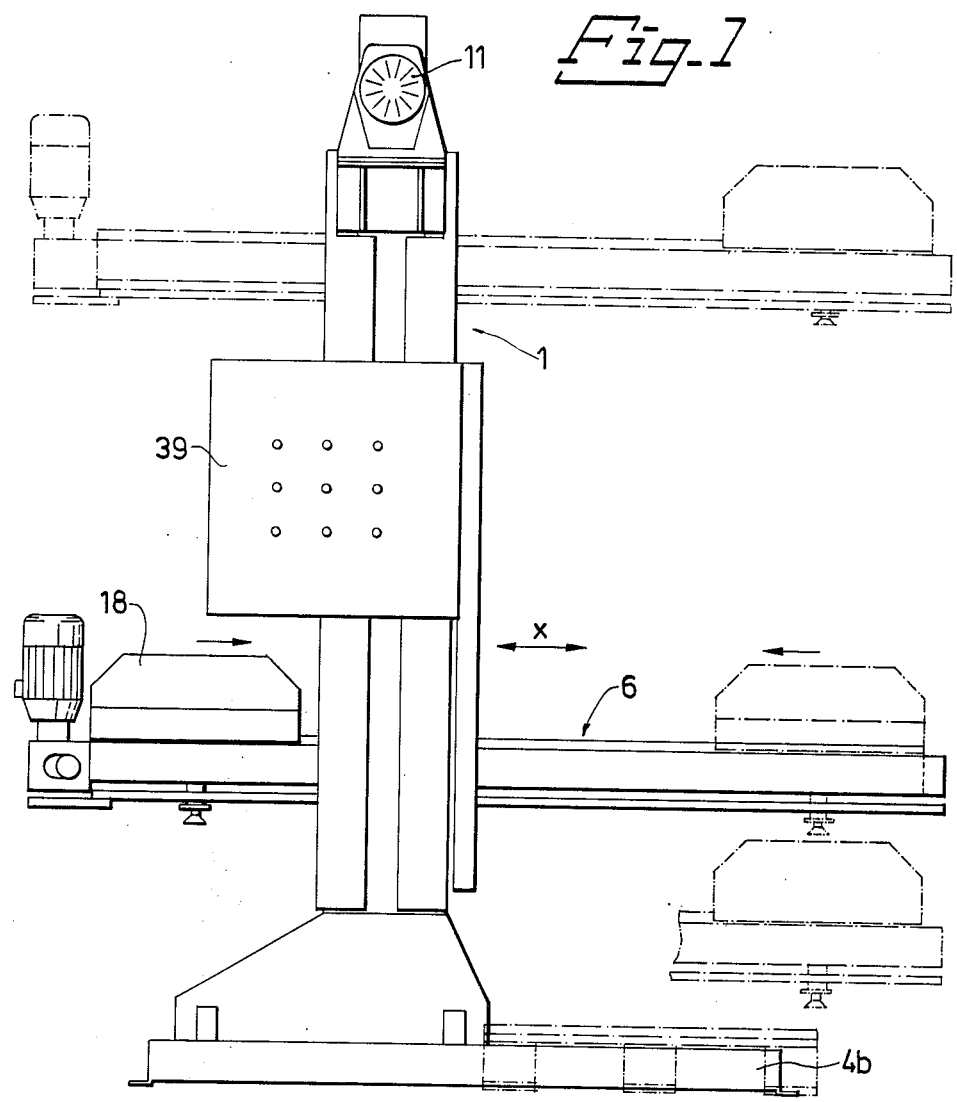
FIG. 1 is a side view of the apparatus, adapted for automatic loading of a pallet according to a predetermined pattern

Referring to FIGS. 1 to 6 the apparatus comprises a structural support, designated generally as 1 and comprising two uprights 2a, 2b mutually connected at the upper end thereof by means of a cross section 3 and being each secured to a base support 4a and 4b, respectively. To stabilize the structure a cross bar 5 may also be arranged between base supports 4a and 4b. A first horizontal frame being open at one end thereof and generally designated as 6 is vertically movable relative to said uprights 2a,2b. As appears from FIG. 2 two wires 7a,7b are secured to the frame 6 at 8a and are wound upon two drums from which only one 9a is shown. Said drums are secured to a transverse shaft 10 which is put in motion by means of an electrical motor 11, supported by a bracket 12 secured to the upright 2b. It is obvious that frame 6 moves upwardly when the wires 7a,7b are wound upon the drums and moves downwardly when the wires are unwound and by aid of the gravity of said frame 6.

Figure 3:
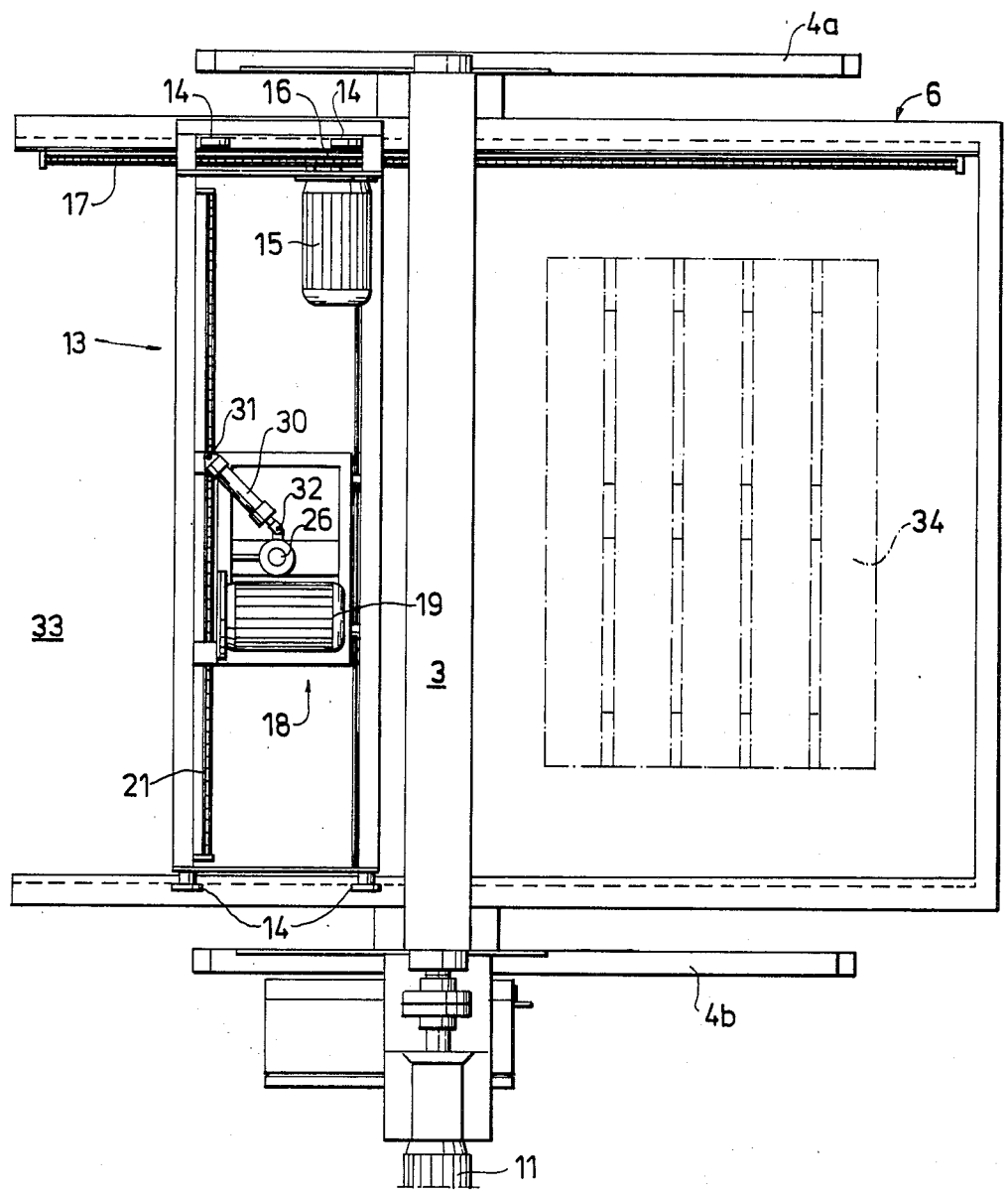
FIG. 3 is a plan view of the apparatus of FIG. 1

As appears from FIG. 3 a second frame 13 is movable horizontally and supported by said first horizontal frame 6 by means of rollers 14 rotatably mounted on shafts secured to frame 13. An electrical motor 15 is securedly fixed to one short side of frame 13 and has secured to its shaft a sprocket wheel 16 which in a manner to be described cooperates with a chain 17 having the ends thereof secured to one of the beams forming frame 6 by means of brackets.

Figure 4:
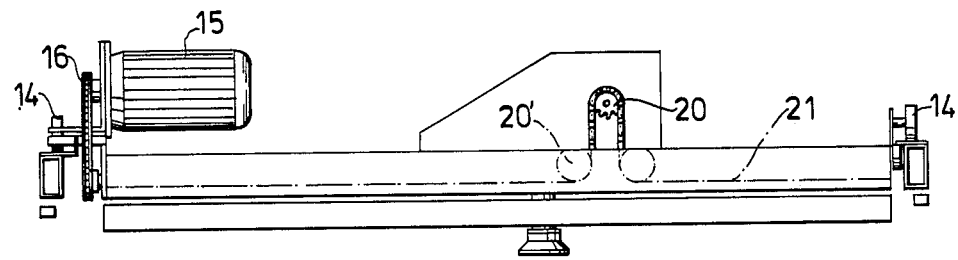
FIG. 4 is an end view of a second frame of the apparatus of FIG. 1
Figure 5:
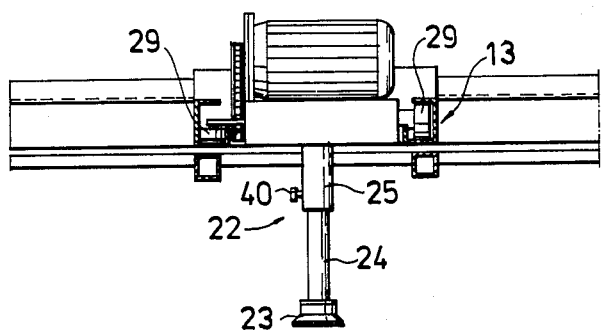
FIG. 5 is an end view of a carriage of the apparatus of FIG. 1.

A carriage 18 is supported by said second frame 13 and is movable horizontally by means of a motor 19 secured to the carriage 18 and being provided with a sprocket wheel 20 (See FIG. 4). By arranging two similar sprocket wheels 20' rotatably on carriage 18 a chain 21 having its ends secured to one of the beams which form the frame 13 by means of brackets may cooperate with the sprocket wheel 20 of the motor such that carriage 18 is moved horizontally when the motor is activated. An arrangement of sprocket wheels 20' rotatably mounted on frame 13 is also used to bring foward a cooperation between the sprocket wheel 16 of motor 15 on frame 13 and the chain 17 just described. The carriage 18 further supports a catching mechanism, generally designated as 22. As clearly appears from FIG. 5 the illustrated catching mechanism comprises a suction cup 23 secured to one end of a shaft 24, which is telescopically received within a hollow shaft 25 and may be secured in any desired axial position relative to said hollow shaft for instance by means of a locking bolt 40. Such an arrangement makes it possible to catch also cartons having upwardly extended sides. The hollow shaft in turn is displaceably but not rotatably received in a sleeve 26.

Figure 6:
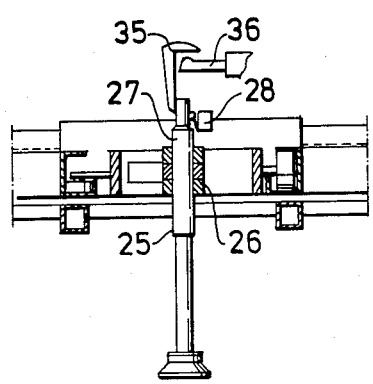
FIG. 6 is a section through the carriage of FIG. 5.

As appears from FIG. 6 the hollow shaft has a chamfered surface 27 which by the upwards displacement of shaft 25 activates a micro-switch 28 for an object to be explained. The carriage is horizontally movable along frame 13 by means of rollers 29. A pneumatic cylinder 30 has one end thereof pivotally connected to carriage 18 at 31 and the plunger thereof pivotally connected to a projection 32 extending from sleeve 26 thereby enabling said sleeve to be turned preferably 90° by said pneumatic cylinder.

As will be apparent from the description of the operation of the apparatus. according to FIGS. 1–6, the apparatus preferably is provided for automatic operating in that sense that the objects are automatically picked up from a first area by means of the apparatus and transferred to a second area but it is also possible to arrange a manual loading in that the objects are manually placed upon a shuttle table which when fully loaded is horizontally moved to an unloading position in which the objects are pushed off the shuttle table.

As appears from FIG. 7, the second frame 13 including the carriage 18 and the catching mechanism is removed from frame 6 and instead a shuttle table 101 is placed upon frame 6 for horizontal movement relative to said frame 6. To this end shuttle table 100 has rollers 103. Additionally a structure is detachably secured to frame 6 by conventional means such as bolts. This structure has shaft 106 at the upper end thereof and pivotally mounted about said shaft is a cross bar structure 107 which may be moved between an upper position as shown by the dotted lines of FIG. 7 allowing the shuttle table and the objects placed thereupon to pass through and a lower position not allowing such a passage of both shuttle table 101 and objects thereto but only allowing passage of the shuttle table.

Figure 2:
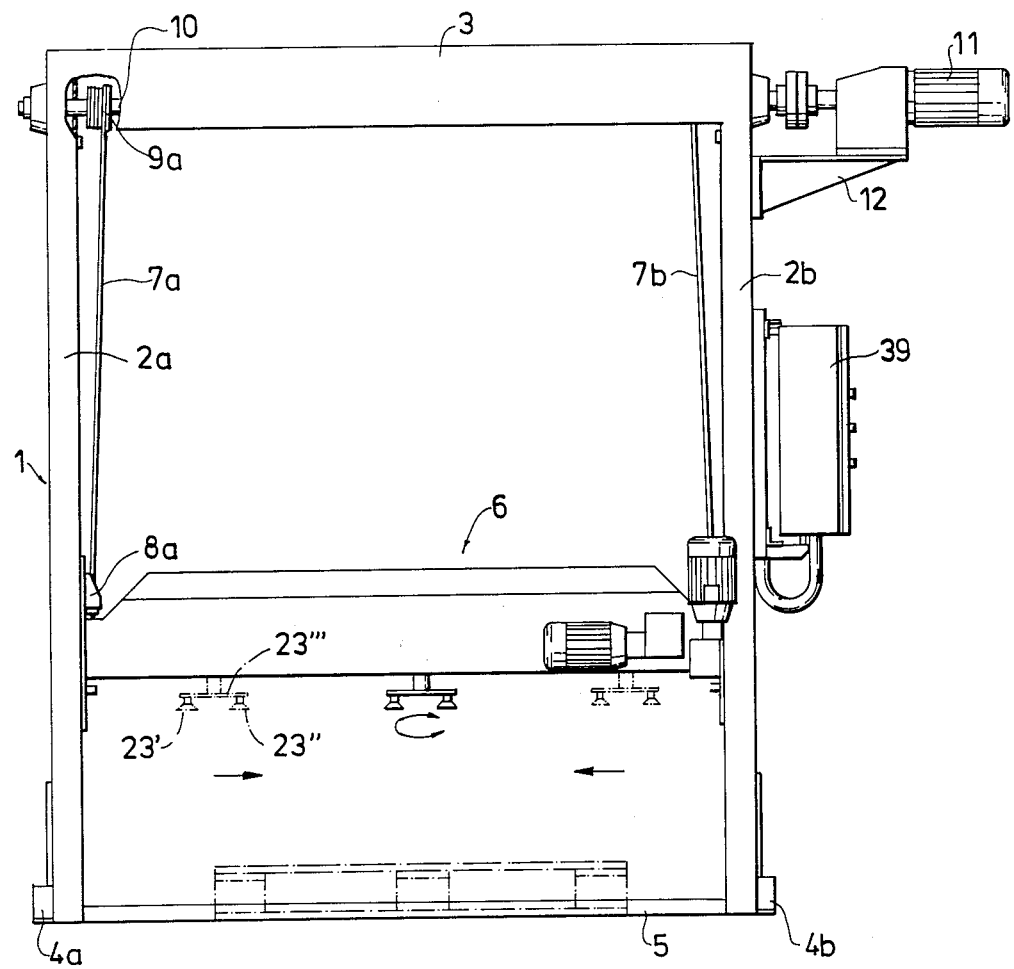
FIG. 2 is a front view of the apparatus of FIG. 1

The apparatus further includes electric and electronic equipment for controlling the movements of the various parts of the apparatus, much of said electric and electronic equipment being housed with control box 39 (see FIGS. 1 and 2).

Operation

The objects to be transferred to and stacked upon a pallet are placed within the area designated 33 and a pallet 34 is placed at the opposite side of the uprights. The second frame 13 is then moved longitudinally and the carriage 18 is moved transversely until the catching mechanism is located above the package or other object to be transferred. The first frame 6 is then lowered until the suction cup 23 comes into contact with an upper surface of the package and is pressed against it mainly by means of the weight of the catching mechanism which means that the first frame is actually lowered to such extent that the shaft is moved upwardly (See FIG. 6) in relation to the carriage, i.e. the first frame is lowered beyond the point in which the suction cup begins to engage said upper surface of the package. By such operation the chamfered surface 27 of said shaft 25 operates micro-switch 28 which in turn activates motor 11, causing the frame 6 to move upwardly. The second frame 13 and the carriage are at the same time brought into motion and bring the package to the desired position above the pallet 34. If necessary the package is angularly shifted for instance 90° by means of the pneumatic cylinder 30 to obtain the best orientation of the package on the pallet and then the first frame is lowered again until the package is located just above the pallet. The catching mechanism is then de-activated in a manner known per se for instance by allowing air to enter the interior of the suction cup via a valve to allow the package to be deposited upon the pallet by its own gravity. It is clear that with such an apparatus also very heavy objects may be transferred and that the transfer may be carried out with high speed as the object is suspended by means of a short and rigid mechanism. Further it is possible to arrange for the most space saving loading as rectangular packages may be oriented either longitudinally or transversely depending upon angular displacement of the catching mechanism.

The arrangement according to FIGS. 1-6 is preferably used for picking up automatically one object at the time and stacking the objects according to a certain pattern. When using the arrangement of manual loading shown in FIG. 7, however, the operator manually loads shuttle table 101 completely with several objects, whereupon the frame 6 is raised, the shuttle table moved, cross bar 107 lowered, the frame 6 lowered to a position just above the pallet or the uppermost layer of objects already stacked thereupon and finally the shuttle table retracted, the cross bar thereby causing the objects to fall down upon the pallet or the objects stacked thereupon.

As appears from FIG. 6 the shaft 25 may have a catch 35 which, when the object has been picked up by the suction cup rests upon an element 36 capable of measuring the tension and such a device can be used to transport objects having too low a weight to a transport line transferring such objects back to, for instance, a filling station. The electric and electronic equipment for controlling these operations can be conventional and much of such equipment is housed in control box 39 as noted above. As appears from FIG. 2 the suction cup may be substituted by two or more suction cups 23', 23" secured to a support 23'''.

What I claim is:

1. Apparatus for loading objects, comprising in combination a first horizontal frame structure which is movable vertically relative to an upright support structure, said frame structure supporting a second horizontal frame which is movable horizontally relative to the first frame structure in one direction, said second frame supporting a carriage which is movable in a direction perpendicular to the movement of said second frame and is provided with a catching mechanism such that said catching mechanism by the displacement of the second frame in one horizontal direction and the displacement of the carriage in a horizontal direction perpendicular thereto may be located over an object at a loading area and moved to a desired position over an unloading area, wherein the first frame structure is rectangular with one side open, two opposite sides thereof being intermediate the ends thereof slidably guided in two spaced apart uprights which latter are mutually connected by means of an upper cross bar, said uprights being each secured to a bottom rail extending perpendicular to said cross bars.

2. Apparatus as claimed in claim 1, wherein the catching mechanism includes a catching element secured to a substantially vertical shaft which is angularly movable between at least two 90° spaced apart positions.

3. Apparatus for loading objects, comprising in combination a first horizontal frame structure which is movable vertically relative to an upright support structure, said frame structure supporting a second horizontal frame which is movable horizontally relative to the first frame structure in one direction, said second frame supporting a carriage which is movable in a direction perpendicular to the movement of said second frame and is provided with a catching mechanism such that said catching mechanism by the displacement of the second frame in one horizontal direction and the displacement of the carriage in a horizontal direction perpendicular thereto may be located over an object at a loading area and moved to a desired position over an unloading area, wherein the catching mechanism includes a catching element secured to one end of a substantially vertical shaft, said shaft being telescopically received in a hollow shaft being vertically movable relative to said carriage and being further angularly movable, said hollow shaft having means to lock said vertical shaft in various axial positions relative to said hollow shaft.

4. Apparatus for loading objects, comprising in combination a first horizontal frame structure which is movable vertically relative to an upright support structure, said frame structure supporting a second horizontal frame which is movable horizontally relative to the first frame structure in one direction, said second frame supporting a carriage which is movable in a direction perpendicular to the movement of said second frame and is provided with a catching mechanism such that said catching mechanism by the displacement of the second frame in one horizontal direction and the displacement of the carriage in a horizontal direction perpendicular thereto may be located over an object at a loading area and moved to a desired position over an unloading area, wherein the carriage supports a pneumatic cylinder provided to angularly move a sleeve provided to slidably but not rotatably received a vertical shaft having secured to one end thereof a catching element.

5. Apparatus as claimed in claim 1, wherein the catching mechanism includes a vertically movable shaft having secured thereto a projection which is provided to come into contact with a tension sensitive means when said shaft is lowered under the influence of the weight of the load of the object to be transferred, said tension sensitive means being provided to operate control means causing the apparatus to move every object having a weight lower than a predetermined weight to a position in which such object will not be deposited at the unloading area but at a transfer mechanism provided to remove it from the apparatus to a station for additional filling.

* * * * *